Nov. 16, 1926.
C. M. LAFFOON
1,607,288
DYNAMO ELECTRIC MACHINE
Filed June 26, 1923
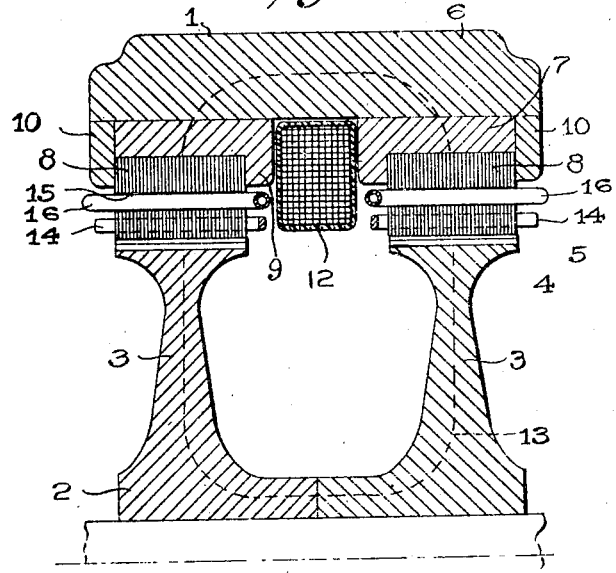
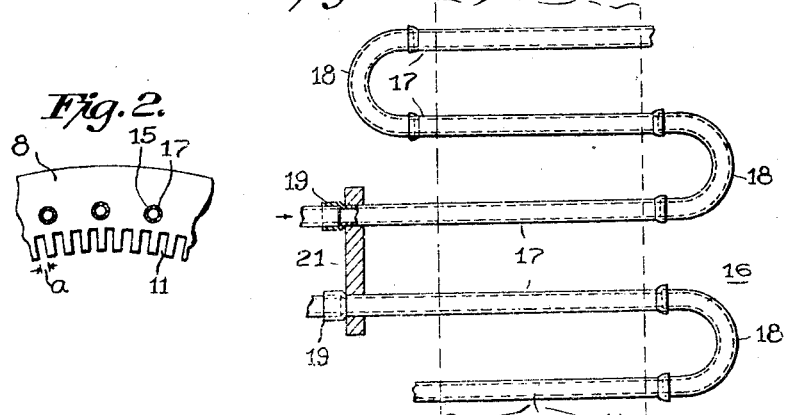
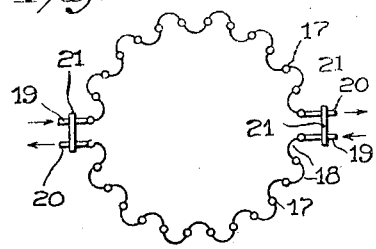
WITNESSES:
R. S. Harrison
S. M. Pineles
INVENTOR
Carthrae M. Laffoon
BY
Wesley G. Carr
ATTORNEY Patented Nov. 16, 1926.

1,607,288

UNITED STATES PATENT OFFICE.

CARTHRAE M. LAFFOON, OF IRWIN, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

Application filed June 26, 1923. Serial No. 647,844.

My invention relates to dynamo-electric machines and particularly to means for cooling the armatures of high-frequency alternators.

In high-frequency alternators of the inductor type, the iron losses under no load conditions, occur chiefly in the teeth of the laminated stator core and in a small depth of the core immediately behind the teeth. These losses are caused by the flux pulsations which are confined, in general, to the part of the core co-operating directly with the poles of the inductor, that is, to the slotted part of the core. Under load conditions, however, the current in the armature conductors produces an additional alternating flux, part of which follows the main magnetic circuit and interlinks the exciting winding, and the remaining part of which is the leakage flux through the slots of the core that interlinks the armature winding only. The additional flux causes additional losses throughout the whole magnetic body of the alternator and it may be a serious limitation in the design of high-frequency machinery.

One object of my invention is, therefore, to provide a cooling system for high-frequency alternators which shall be located near the source of the losses and heat generation.

Another object of my invention is to utilize the cooling system as a damper winding for reducing the flux pulsation caused by the armature reaction.

In carrying out my invention, I provide cooling pipes adapted to carry a circulating cooling liquid in the immediate neighborhood of the armature teeth. The pipes are of electrically conducting material and are embedded in perforations parallel to the slots of the core as close to the teeth as mechanical considerations will permit. These pipes act, at the same time, as a closed-circuit winding, damping the flux pulsation caused by the current flowing in the high-frequency winding.

My invention will be best understood from the accompanying drawings, wherein—

Figure 1 is a view in vertical section through the upper half of a high frequency generator embodying my invention;

Fig. 2 is a transverse sectional view of a portion of the laminated armature core;

Fig. 3 is a developed view of a portion of the cooling system employed in embodiment shown in Fig. 1; and Fig. 4 is a diagrammatic view illustrating the cooling system.

In Fig. 1 is shown a high-frequency alternator consisting of a stator 1 and a rotor 2. The rotor consists of a cylindrical body having two disc-shape extensions 3 provided with a cylindrical peripheral portion 4 carrying polar projections 5 causing the rotor to operate as an inductor member.

The stator consists of a frame or yoke 6 and two rings 7 secured within the yoke. The frame 6 and the rings 7 are of solid magnetic material. Annular cores 8 of laminated magnetic material are clamped between flanges 9, which are provided on the rings 7, and clamping rings 10. The cylindrical surface of the laminated core is provided with uniformly distributed slots 11 shown in Fig. 2. A field coil 12 is secured between the rings 7 and provides the main flux flowing through the stator frame 6, the laminated cores 8 and the rotor 2, as shown by the dotted line 13. A winding 14 is embedded into the slots 11 and it carries high-frequency currents induced by the rotating inductor.

The laminated core is further provided with perforations 15 disposed parallel to the slots 11 as near to the bottom of the slots 11 as is mechanically admissible. A system of pipes 16 of conducting material, such as copper, which is embedded in the perforations 15, is adapted to circulate a cooling liquid for carrying away the heat generated in the body surrounding the pipes.

In Fig. 3 is shown in detail the construction of the cooling system. Straight pipe elements 17 are embedded within the perforations 15 of the core, and adjacent pipe elements are joined by bent pipe connectors 18 also of conducting material. The pipe joints are sweated and soldered. The individual elements may be connected in two parallel circuits, as shown in Fig. 4, having inlets 19, leading to pumps or another external source of liquid, not shown in the drawing, and outlets 20, whereby the cooling liquid is circulated through the pipes. The terminals 19 and 20 of the pipes are connected electrically by means of conducting clamping devices 21, whereby the piping system 16 constitutes a closed-circuit zigzag damping winding.

In operation, the cooling coils being located adjacent to the source of the losses of the machine serve to conduct away quickly and effectively the heat from that part of the armature. This construction permits operation of the armature conductors at a higher current density than other constructions employed at present. At the same time, the closed-circuit pipe system 16 acts as a very effective damper winding for preventing the high-frequency flux induced by the armature currents from transversing the solid parts of the magnetic circuit thereby reducing the iron losses and heating to a minimum.

My invention is not limited to the particular construction shown in the drawing. The pipes, for instance, may be connected by means of electrical connectors on both sides of the laminated armature so as to resemble a familiar squirrel-cage winding. Many other modifications will be apparent to those skilled in the art and accordingly, I seek to cover, in the appended claims, all modifications which come within the true scope and spirit of my invention.

I claim as my invention:—

1. A high-frequency alternator of the inductor type comprising a rotatable inductor core of solid magnetic material, the periphery of said inductor core being provided with a plurality of solid polar projections, a laminated core having a circular face cooperating with the periphery of the inductor core, the circular face of said laminated core being provided with teeth and an armature winding between the teeth, means for producing a unidirectional magnetic flux along the path through said laminated core teeth, the polar projections on the inductor and the solid inductor body, the circular movement of the inductor projections causing pulsations of the tooth flux to induce a high-frequency alternating voltage in said armature winding, and a short-circuited damper winding embedded in said laminated core adjacent to said armature winding and so related thereto that flux pulsations induced by currents in said armature winding are dampened and substantially prevented from reaching the solid core portions, the portions of the damper winding embedded in the core comprising tubes of good conducting material arranged to carry a cooling liquid for cooling the adjacent core portions.

2. A dynamo-electric machine comprising a stator member having a circular laminated magnetic core, an alternating-current winding in slots upon a circular face of said core, said core being provided with perforations disposed in proximity and parallel to said slots, and pipes of electrically conducting material embedded in said perforations and adapted to carry a circulating cooling liquid for cooling said core, said pipes being arranged to provide a closed-circuit winding interlinked with the pulsating flux induced by the current flowing in said alternating-current winding.

3. A high-frequency alternator comprising an inductor rotating at high speed and having a pair of cylindrical portions provided with magnetic pole pieces, a stator having a pair of cores of laminated magnetic material surrounding said cylindrical portions of the inductor, said core being provided with cylindrical faces having axially disposed slots and substantially axial perforations adjacent to the bottoms of said slots, an alternating-current winding in said slots, and pipes of electrically conducting material embedded in said perforations, means for conducting a cooling fluid to and from said pipes externally of said machine, said pipes being interlinked with the flux pulsations induced by the current flowing in said alternating-current winding and adapted to circulate currents tending to suppress said flux pulsations.

4. In a dynamo-electric machine, a stator having a laminated part provided with slots forming teeth, a winding in said slots, rotary means for causing flux variations through said teeth, a plurality of tubes in said stator as close to the bottoms of said slots as manufacturing methods permit, said tubes being so connected into a closed circuit as to dampen the flux pulsations produced by currents in said winding, and means for supplying a cooling fluid to said tubes.

In testimony whereof, I have hereunto subscribed my name this 22nd day of June 1923.

CARTHRAE M. LAFFOON.